Aug. 22, 1933.  A. W. LEET  1,923,382
VEHICLE SHIPPING DEVICE
Filed Dec. 11, 1929
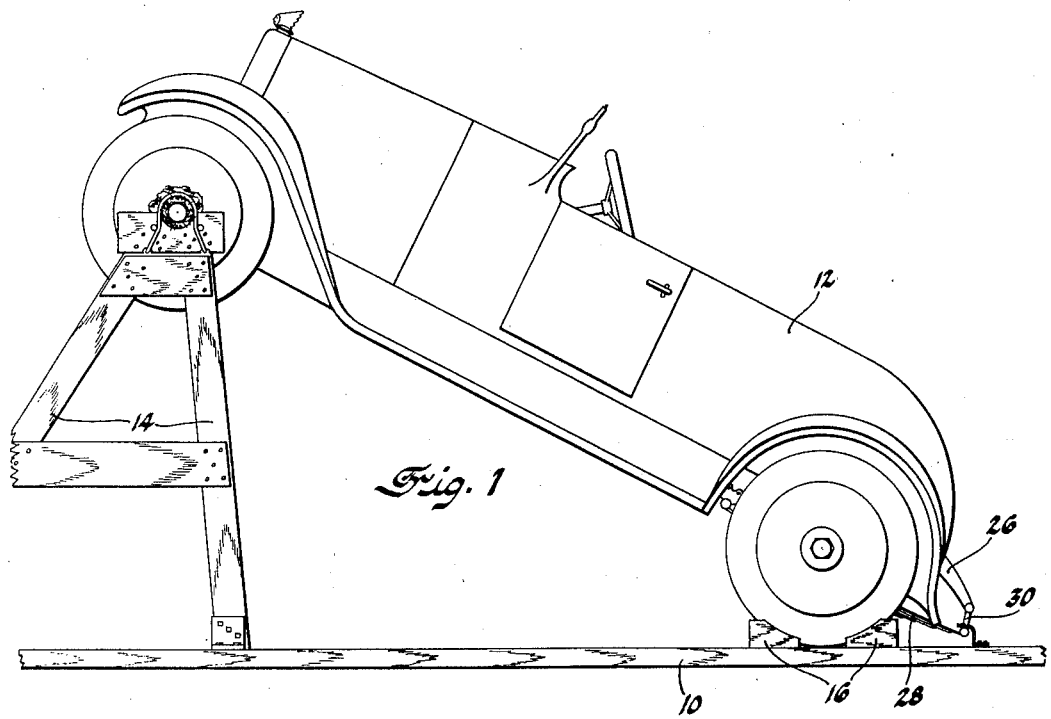
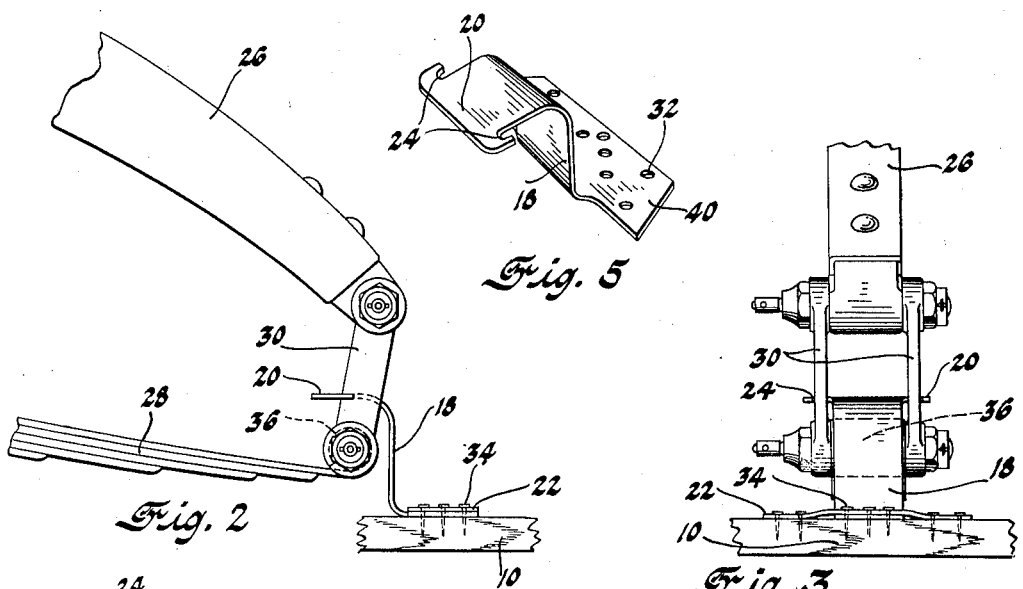
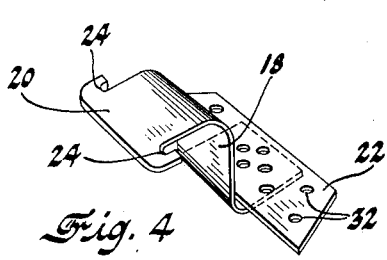
Inventor
Archie W. Leet
By Blackmore, Spencer & Hink
Attorneys Patented Aug. 22, 1933

1,923,382

UNITED STATES PATENT OFFICE 1,923,382

VEHICLE SHIPPING DEVICE

Archie W. Leet, St. Louis, Mo., assignor to General Motors Corporation, Detroit, Mich., a Corporation of Delaware Application December 11, 1929
Serial No. 413,260

10 Claims. (Cl. 188—32)

This invention relates to the shipment of automobiles in freight cars, and more particularly to that form of shipment wherein some of the vehicles have one end supported a considerable distance above the floor in order that other vehicles may be placed partly underneath them. The vehicles must be securely held in the freight car in order that they may not be thrown about as a result of the violent shocks encountered by the freight car in transit. Various forms of hold down devices for securing the vehicle to the freight car floor have been devised, some of which are adapted to fit over the rim bolts, the wheel hubs or the axles. All of these devices that I am familiar with are subject to the objection that they are difficult to assemble in position, since either some part of the vehicle such as the rim bolt must be removed and replaced, or some packing means must be provided between the hold down and the part of the vehicle to which it is to be attached, for the purpose of preventing injury to the finish of that part, or as in the case of the type of hold down which is secured to or over the vehicle axle, the hold down must be placed in position in a very inaccessible location, and this of course requires considerable time.

It is therefore an object of this invention to provide a device for securing the vehicle in position upon the freight car floor, which device is located in a very accessible position and which may be connected to the vehicle without the removal of any parts of the latter, and with which it is not necessary to use any packing or cushioning material. These objects are attained by constructing the hold down device so that it may be inserted between the side bars of the vehicle rear spring shackle, which assumes a position comparatively close to the freight car floor when the front end of the vehicle is elevated to permit the placing of a second vehicle beneath it.

Other objects and advantages will be apparent upon referring to the specification and accompanying drawing, in which:

Figure 1 is a side elevation showing an automobile held in position on a freight car floor, with the front end of the vehicle supported in elevated position, and showing my improved hold down device associated with the rear spring shackle.

Figure 2 is a fragmentary view showing the rear portion of the vehicle and the hold down device in side elevation and on a larger scale.

Figure 3 is a fragmentary view showing the parts illustrated in Figure 2, as viewed from the rear of the vehicle.

Figure 4 is a perspective view of my improved form of hold down device.

Figure 5 is a perspective view of a modified form of hold down device.

The reference numeral 10 indicates a freight car floor upon which a motor vehicle 12 is to be secured. In order to get the maximum possible number of vehicles into the freight car, the front end of the vehicle is held in elevated position by means of a support 14, so that a second vehicle may be placed partly under the first. Since the freight car is subject to a considerable amount of bumping and jolting when in motion, some means must be provided to prevent relative movement of the vehicles in any direction in order that they may not become damaged by coming into contact with either the freight car walls or with each other. Chock blocks 16 of any of the well known types may be inserted between the vehicle tires and the floor and will serve to prevent movement of the vehicle in a horizontal direction under ordinary conditions. However, when the freight car receives a severe jolt, there is a tendency for the vehicles held therein to be thrown upwardly, and if some means were not provided to prevent this vertical movement they might roll over the chock blocks and thereupon become damaged.

In order to positively prevent vertical movement of the rear end of the vehicle 12 as a result of such shocks I have devised the form of hold down shown in Figure 4. This consists of a strip of metal having a body portion 18, a head portion 20, and a foot portion 22 secured to the body portion by riveting, welding or in any other suitable manner. The head and foot portions extend at a right angle to the body portion, and there are notches 24 provided at the point of connection of the head portion 20 to the body portion 18, for a purpose to be later described.

As the front end of the vehicle 12 is being raised to elevated position, the vehicle pivots about the center of the rear axle and consequently the vehicle frame 26, the rear spring 28 and the shackle bars 30 which connect the latter to the frame are swung about until they reach a position comparatively close to the freight car floor, as shown in Figures 1 and 2. My improved hold down device is so proportioned that by holding it in an angular position with respect to the shackle bars, the head 20 may be inserted between the bars after which the hold down is swung to the position shown in Figures 1 to 3, so that the body portion 18 lies between the shackle bars 30, with the head 20 engaging the forward edges of the bars. The foot portion 22 has openings 32 formed in it to permit the passage of nails 34 which secure the foot portion to the freight car floor. The head portion 20 is positioned a sufficient distance above the foot portion 22 so that it will not contact with the vehicle spring eye 36, in order that the hold down shall not be subjected to strain caused by the continuous slight up and down movement of the vehicle during transit. This continuous strain might fatigue the metal in the hold down and cause it to break. The function of the hold down is to act as a safety device to prevent substantial vertical movement of the vehicle when severe shocks are encountered, the chock blocks 16 serving to prevent horizontal movement of the vehicle as a result of ordinary shocks. It will be understood however that by forming the hold down device of heavier metal it may be relied on to prevent both vertical and horizontal movement, and the chock blocks 16 dispensed with. By forming the hold down so that the shackle bars 30 fit into the notches 24, it will be readily seen that the head 20 is prevented from becoming twisted or bent to such an angular position as would permit it to slip out from between the shackle bars. In Figure 5 the hold down is shown with the foot portion 40 formed integral with the body portion 18.

It will be obvious that my improved hold down device may be assembled much more quickly than the usual types due to the fact that none of the vehicle parts need be removed or replaced, as well as the fact that the hold down device is located in an accessible position whereby it may be readily secured to the car floor. Since the shackle bars are parts which are not ordinarily provided with a high grade finish it is not necessary to insert any packing or cushioning material between them and the hold down. This of course not only reduces the cost of the hold down device but also reduces the amount of time necessary to install or remove it.

It is thought from the foregoing taken in connection with the accompanying drawing that the construction and operation of the device will be apparent to those skilled in the art, and that various changes in size, shape, and proportion and details of construction may be made without departing from the spirit and scope of the appended claims.

I claim

1. A holding member for anchoring a vehicle to the floor of a shipping conveyance consisting of a member, one end of which is adapted to be secured to the floor, the other end being T-shaped and being adapted to fit between the vehicle spring shackle bars.

2. A holding member for anchoring a vehicle to the floor of a shipping conveyance consisting of a bent plate having a head at one end and a foot at the other end, the foot being adapted to be secured to the floor with the body portion extending between the vehicle spring shackle bars, there being notches adjacent the head, the edges of said notches being adapted to fit against the shackle bars.

3. The combination with the rear spring shackle of a motor vehicle, of a holddown extending between the shackle and vehicle support.

4. The combination with a vehicle spring shackle and a support to which it is desired to secure the vehicle, of a member having one end connected to said spring shackle and its opposite end secured to said support.

5. The combination with the side bars of a vehicle spring shackle and a support, of a member having a head at each end, the head at one end being secured to the support, the intermediate portion of said member extending between the side bars, and the head at the opposite end engaging said side bars.

6. In combination with the wheels and spring shackles of a vehicle and a support, chock blocks secured to the support against the vehicle wheels to prevent horizontal movement of the vehicle, and means secured to the support and engaging the spring shackles to limit vertical movement of the vehicle.

7. In combination with the wheels and spring shackle side bars of a vehicle and a support, chock blocks secured to the support against the vehicle wheels to prevent horizontal movement of the vehicle, and a plate, one end of which is secured to the support and the other end of which extends between and engages the shackle side bars to limit vertical movement of the vehicle.

8. In combination with the wheels and spring shackles of a vehicle and a support, means secured to said support and engaging said wheels to prevent horizontal movement of said wheels relative to said support, and means secured to said support and engaging said shackles to limit vertical movement of the vehicle relative to said support.

9. The combination with a vehicle and a support to which it is desired to secure said vehicle, said vehicle including a chassis frame, axles, wheels carried by said axles and springs secured to said axles and connected to said chassis frame by shackle bars, of means secured to said support and engaging said shackle bars to limit movement of said chassis frame relative to said axles and wheels.

10. The combination with vehicle spring shackle side bars and a support, of a hold-down device comprising a body portion, a foot portion and a head portion, the foot portion being secured to the support, the body portion extending between the shackle side bars and the head portion engaging the side bars to limit movement of the vehicle relative to the support.

ARCHIE W. LEET.